(12) United States Patent
Fridlington, Jr. et al.

(10) Patent No.: US 7,641,011 B2
(45) Date of Patent: Jan. 5, 2010

(54) PALLET JACK HAVING WIDTH-ADJUSTABLE FORK PRONGS

(75) Inventors: Keith Wayne Fridlington, Jr., 7218 Pflumm Rd., Shawnee, KS (US) 66126; Keith Wayne Fridlington, Sr., Knoxville, IA (US)

(73) Assignee: Keith Wayne Fridlington, Jr., Shawnee, KS (US)

( * ) Notice: Subject to any disclaimer, the term of this patent is extended or adjusted under 35 U.S.C. 154(b) by 664 days.

(21) Appl. No.: 11/378,545

(22) Filed: Mar. 18, 2006

(65) Prior Publication Data

US 2006/0181039 A1    Aug. 17, 2006

(51) Int. Cl.
  *B62D 21/14* (2006.01)
  *B60K 1/00* (2006.01)
(52) U.S. Cl. .................. 180/68.5; 280/43.12; 280/638
(58) Field of Classification Search .................. 180/12, 180/13, 68.5, 19.2, 19.3, 332, 209; 280/43.12, 280/43.23, 641; 414/451, 667, 671
See application file for complete search history.

(56) References Cited

U.S. PATENT DOCUMENTS

| 1,083,982 | A | | 1/1914 | Blessing | | |
|---|---|---|---|---|---|---|
| 2,109,305 | A | | 2/1938 | Stine | | |
| 2,367,752 | A | | 1/1945 | Broome | | |
| 2,500,047 | A | | 3/1950 | Smith | | |
| 2,592,644 | A | | 4/1952 | Bartlett | | |
| 2,846,018 | A | * | 8/1958 | Puckett | ...................... | 187/231 |
| 2,875,852 | A | * | 3/1959 | Morrell | ...................... | 187/229 |
| 2,899,093 | A | * | 8/1959 | Morrell | ...................... | 414/639 |
| 3,462,167 | A | * | 8/1969 | Rateau | ...................... | 280/43.12 |
| 3,529,736 | A | * | 9/1970 | Lebre | ...................... | 414/458 |
| 3,701,211 | A | * | 10/1972 | Best | ...................... | 280/43.12 |
| 3,982,767 | A | | 9/1976 | Larsson et al. | | |
| 4,105,218 | A | | 8/1978 | Newell | | |
| 4,177,001 | A | * | 12/1979 | Blackwood | ................. | 414/628 |
| 4,213,624 | A | | 7/1980 | Sanders | | |
| 4,533,290 | A | | 8/1985 | Hackauf | | |
| 4,655,670 | A | * | 4/1987 | Hogberg et al. | ............. | 414/458 |
| 4,826,474 | A | | 5/1989 | Holmes | | |
| 4,923,361 | A | | 5/1990 | Adolfsson | | |
| 4,969,794 | A | | 11/1990 | Larsen | | |
| 5,096,363 | A | | 3/1992 | Weinert et al. | | |
| 5,190,436 | A | | 3/1993 | Sorlie | | |
| 5,403,024 | A | * | 4/1995 | Frketic | ...................... | 280/43.12 |
| 5,427,493 | A | | 6/1995 | Lucy | | |
| 5,823,737 | A | | 10/1998 | Cook | | |
| 5,975,826 | A | | 11/1999 | Scholder | | |
| 6,431,805 | B2 | * | 8/2002 | Lanciaux, Jr. | ................. | 414/12 |
| 6,551,050 | B1 | * | 4/2003 | Kallevig et al. | ............. | 414/607 |
| 6,808,357 | B2 | * | 10/2004 | Lee | ............................. | 414/495 |

* cited by examiner

*Primary Examiner*—Glenn Dayoan
*Assistant Examiner*—Bridget Avery
(74) *Attorney, Agent, or Firm*—Hovey Williams LLP

(57) ABSTRACT

A pallet jack includes a frame and a pair of outwardly projecting load prongs connected to the frame. The proximal ends of the prongs are connected to a horizontal member on the rear of the frame by brackets that keep the prongs out of the frame proper. A threaded rod is mounted horizontally on the horizontal member and is threaded into the proximal end of each prong, with the two ends of the threaded rod having opposite hand threads. The threaded rod is rotated by a user turning a crank mounted on top of the frame and connected to the adjustment threaded rod by a chain drive, allowing the width between the prongs to be adjusted inwardly or outwardly.

7 Claims, 8 Drawing Sheets

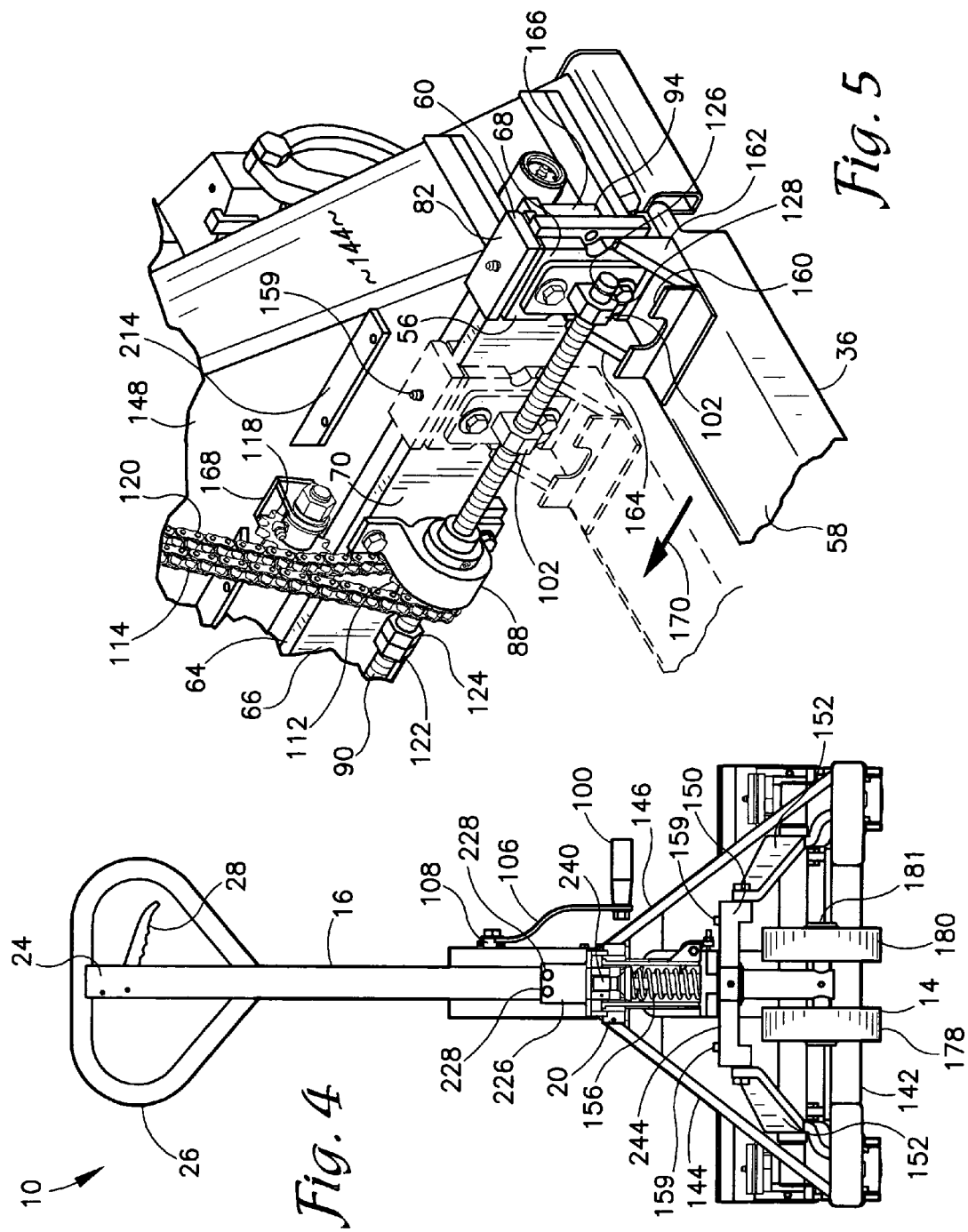

PALLET JACK HAVING WIDTH-ADJUSTABLE FORK PRONGS

CROSS-REFERENCE TO RELATED APPLICATIONS

Not Applicable.

STATEMENT REGARDING FEDERALLY SPONSORED RESEARCH OR DEVELOPMENT

Not applicable.

SEQUENCE LISTING

Not applicable

BACKGROUND OF THE INVENTION

The present invention is related to an apparatus and process for

DESCRIPTION OF THE RELATED ART INCLUDING INFORMATION DISCLOSED UNDER 37 C.F.R. 1.97 AND 1.98

Pallet jacks for moving a single pallet are well known. Pallets suitable for use with a pallet jack typically include an upper load bearing sheet of material and a lower load bearing sheet of material that are parallel to one another, are of the same size and have vertically aligned perimeters. The upper and lower sheets are spaced apart a few centimeters and fixed in their spacial relationship by a number of spaced connected frame members. Either sheet of material may serve as the top sheet, upon which a load is placed. The prongs of a pallet jack are inserted into the spaces between the frame members to permit the load to be lifted by a desired amount for ready transport from one location to another. Typically two parallel outwardly extending prongs forming a single fork are employed on pallet jacks.

Typically such pallet jacks include a frame supported by a truck with a jack housed in the frame and an elongated pulling handle pivotally connected to the frame. A pair of spaced parallel prongs form a fork that extends outwardly from the frame in a direction opposite of the handle. One or more small wheels or rollers support the distal ends of the prongs against a smooth surface such as a concrete floor. The jack, which is typically a hydraulic bottle jack, is raised by pumping the handle up and down, causing the base of the jack to bear against the truck, which is typically a two-wheeled truck, and upward against the top of the frame, lifting the fork off the ground and allowing it to be slipped into the space between the upper and lower pallet surfaces and between the frame members of the pallet. The load rollers, located toward the outer ends of the prongs, remain in constant contact with the floor or ground allowing the loaded pallet jack to be easily moved about.

Pallet jacks designed to hold a single pallet at a time can be moved by a person pulling on the handle or by an electric motor, methane motor or the like. Such pallet jacks can carry up to about 2,300 kg (5,000 pound) loads.

Although many pallets are built in standard dimensions, no uniform specifications exist. Some pallets, for example, may be specifically designed and built for a specific application or specific goods. As a result, pallets of many different sizes may be found at a single site, such as a warehouse. In many cases where operators need to move a single pallet and many different sized pallets are found, the operation has several different pallet jacks, each having a different spacing between the two prongs of its fork. This solution requires significant additional capital expenditures and results in lost time because the workers must locate and retrieve the correct sized pallet jack for each different pallet.

When high lifting is required, such as to deposit or retrieve a pallet from a shelf or stack several feet above the floor, a fork-lift truck is typically used. Different sized pallets cause the same problems for fork-lift trucks as for pallet jacks and addressing this problem has led to some patents that disclose different means for adjusting the distance between the prongs.

For example, U.S. Pat. No. 5,190,436 B1, issued to Sorlie on Mar. 2, 1993, discloses a Carriage Assembly Having Side Shiftable and Adjustable Forks comprising a fork lift truck and having a pair of outwardly extending prongs defining a fork. The spacing between the prongs can be changed by horizontally mounted hydraulic jacks fixed to vertical portions of the prongs.

In another example, U.S. Pat. No. 5,096,363 B1, issued to Weinert et al. on Mar. 17, 1992, discloses a Multiple-Pair Fork Positioner comprising a fork lift truck having two pairs of prongs, and outer pair and an inner pair. The spacing between the outer prongs can be adjusted by horizontally mounted positioning hydraulic actuators. The spaced relationship between the inner forks and the outer forks is mechanically determined.

In another example, U.S. Pat. No. 4,533,290 B1, issued to Hackauf on Aug. 6, 1985, discloses a Fort-Lift Attachment with Four Laterally Displaceable Prongs comprising an attachment for a forklift truck that is fixed to an existing vertical lifting plate and two pairs of space outwardly projecting prongs, with each prong connected to a vertical member. The spacing between the two sets of prongs can be adjusted using horizontally mounted hydraulic jacks.

Each of the three above references includes limitations that cannot be used in a pallet jack. Each solution is too heavy and powerful and expensive for use on a pallet jack. They also depend on having a vertical portion of each prong mounted onto a vertically oriented reinforcing frame, requiring strength and space not available in a pallet jack.

References to a pallet jack having prongs that can be spread farther apart or brought closer together have not been found. In a related field, however, hand trucks having width adjustable means have been located and include, for example, U.S. Pat. No. 5,427,493, issued to Lucy on Jun. 27, 1995, discloses a Hand Truck with Horizontally Spreadable Arms comprising a two-wheeled hand truck having a horizontally mounted hand crank about half-way up the frame members which drives a chain 14. The chain drive turns an upper sprocket and a lower sprocket, which drives a pair of horizontal screws, which are joined into one bar with floating nuts 42 that laterally move in opposite directions along the screws, to move the gripping extensions, i.e., a load platform, farther apart or closer together.

In another example, U.S. Pat. No. 2,592,644, issued to Bartlett on Apr. 15, 1952, discloses a Hand Truck comprising a hand crank that pushes down or pulls up on a transfer plate, which is pivotally connected to a pair of arms that then toggle inward and outward to drive apart or pull together the forks on the hand truck.

In another example, U.S. Pat. No. 2,500,047, issued to Smith on Mar. 7, 1950, discloses an Adjustable Clamp Truck that is somewhat similar to Bartlett '664 above in that the arms are mechanically driven through a vertical screw and connected pivoting complex mechanical linkages to move the jaws 42 into clamping or release position.

In another example, U.S. Pat. No. 2,367,752, issued to Broome on Jan. 23, 1945, discloses a Hand Truck comprising a vertically mounted screw that moves vertical sleeves up and down, with one sleeve floating up and down the un-threaded shaft, while the lower sleeve is actively driven by the screw threads. Pivoting levers arranged in a mechanical linkage drive a set of arms farther apart or closer together, thereby driving the prongs of the hand truck farther apart or closer together.

In another example, U.S. Pat. No. 2,109,305, issued to Stine on Feb. 22, 1938, discloses a Clamp Truck comprising a pair of operating arms that have a ball on their lower ends, with each ball being received into a groove in the prongs. The top ends of the operating arms are sleeves that move along the hand crank operated shaft. When the sleeves are brought closer together, the prongs move farther apart and visa versa or grip or release an object. A handle 28 can be pushed to grip an object or to release an object.

Because hand trucks typically include a vertical frame that the load leans against when the hand truck is in use, the hand truck provides a good deal of space for a vertically oriented control apparatus for spreading apart a load bearing arms in the horizontal base plate area of a hand truck. Because a pallet truck does not provide this vertically oriented space, the extensive mechanical linkages, vertically aligned driving mechanisms and the like are not available for use on a pallet jack.

Therefore a need exists for a pallet jack having width-adjustable fork prongs having prongs that can be spread farther apart or brought closer together; that can be quickly and readily adjusted by a single user; that is set into a desired position after adjustment; that prevents the prongs from being set so close together that a load will cause the pallet jack to tip; and that can be used quickly and easily with minimal training because the adjustment and operation of the pallet jack are simple.

BRIEF SUMMARY OF THE INVENTION

Accordingly, it is a primary object of the present invention to provide a pallet jack having width-adjustable fork prongs with prongs that can be spread farther apart or brought closer together.

It is another object of the present invention to provide a pallet jack having width-adjustable fork prongs that can be quickly and readily adjusted by a single user.

It is another object of the present invention to provide a pallet jack having width-adjustable fork prongs that is set into a desired position after adjustment.

It is another object of the present invention to provide a pallet jack having width-adjustable fork prongs that prevents the prongs from being set so close together that a load will cause the pallet jack to tip.

It is another object of the present invention to provide a pallet jack having width-adjustable fork prongs that can be used quickly and easily with minimal training because the adjustment and operation of the pallet jack are simple.

These and other objectives of the present invention are achieved by providing a pallet jack having width-adjustable fork prongs having a crank operated chain drive mechanism that rotates a horizontally mounted adjustment screw having left-handed threads on one side of a centerline and right-handed threads on the other side of the centerline with a nut threaded through the screw on each side of the centerline and each fastened to a bracket that carries one of the two prongs that comprise the fork. Each prong is mounted on a bracket that rides along a horizontally oriented frame rail.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE SEVERAL VIEWS OF THE DRAWING

FIG. 4 is a front view of the pallet jack having width-adjustable fork prongs of FIG. 1.

FIG. 5 is a fragmentary isometric view of the fork prong adjustment mechanism of the pallet jack having width-adjustable fork prongs of FIG. 1.

DETAILED DESCRIPTION OF THE INVENTION

Figure 1:
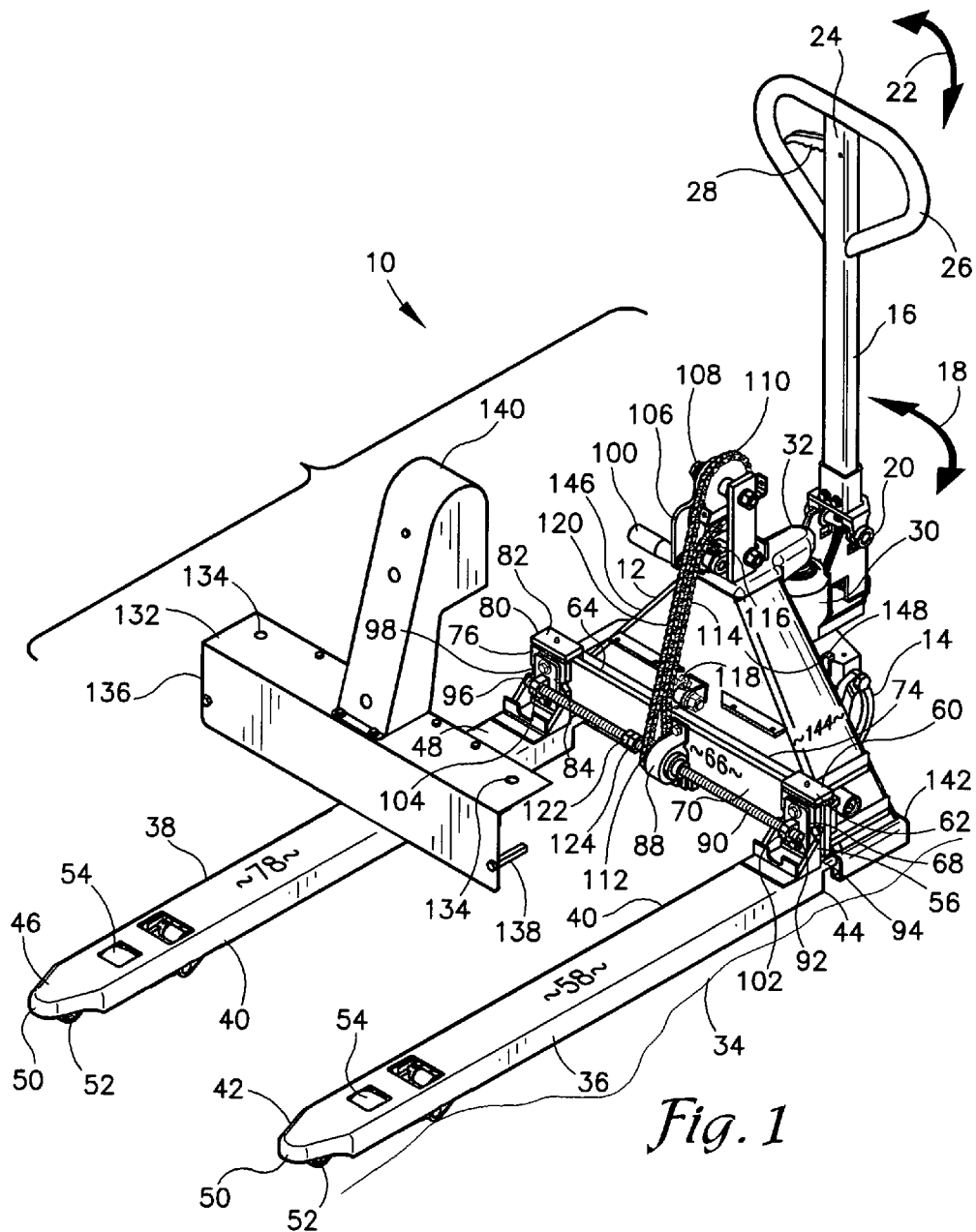
FIG. 1 is an isometric view of a pallet jack having width-adjustable fork prongs according to the present invention shown with the protective housing exploded away to reveal the fork width adjustment mechanism.

Referring to FIG. 1, a pallet jack having width-adjustable fork prongs (pallet jack) 10 according to the present invention includes a frame 12 having a two-wheeled pivoting truck 14 connected to it. An elongated handle 16 is mounted for pivoting movement up and down along the directions of the double-headed arrow 18 at the pivot point 20 and from side-to-side along the direction of the double-headed arrow 22. Adjacent to the proximal end 24 of the handle 16 is a bow-shaped gripping handle 26 with a pressure release control valve trigger 28, which releases pressure in the hydraulic bottle jack 30 allowing the pallet jack 10 to lower into its normal position via a control cable connected to the pressure release valve on the hydraulic bottle jack 30. The piston on the hydraulic bottle jack 30 pushes upward on the frame cap 32 when the piston is extended, lifting the entire pallet jack 10 upward and off the floor 34, with the pallet jack 10 supported by the truck 14 and the load rollers xx.

Still referring to FIG. 1, with the left-side prong 36 and the right-side prong 38 of the fork assembly 40 are lifted off the floor 34. Handedness is determined from an operator a the proximal end 24 of the handle 26 facing the prongs of the fork 40. Similarly, "front" refers to a part or surface or portion of the pallet jack 10 nearer to an operator standing at the handle 26 and "rear" refers to a part of surface or portion of the pallet jack 10 farther from the operator standing at the handle 26. The left-side prong 36 includes a distal end 42 and a proximal end 44, while the right-side prong 38 includes a distal end 46 and a proximal end 48. Each distal end 42, 46 includes a rounded tapered arrowhead toe portion 50, which facilitates insertion of the toe portions 50 into the spaces between the vertical pallet support members. Beneath each toe portion 50 a caster 52 is mounted. Adjacent to each toe portion 50 and inward of the distal ends of the prongs 34, 48 a load roller 54 is mounted.

Still referring to FIG. 1, a left-side prong mounting bracket 56 is fixed to the upper surface 58 of the left-side prong 36 and includes a U-shaped channel bracket portion 60 having a horizontal portion 62 that bears against and is free to slide along the upper edge 64 of the prong supporting and carrying frame member 66. The vertical bracket portion 68 bears against the rear face 70 of the prong supporting and carrying frame member 66 (See also FIG. 10). Similarly, a right-side prong mounting bracket 76 is fixed to the upper surface 78 of the right-side prong 38 and includes a U-shaped channel bracket portion 80 having a horizontal portion 82 that bears against and is free to slide along the upper edge 64 of the prong supporting and carrying frame member 66. A vertical bracket portion 84 bears against the rear face 70 of the prong supporting and carrying frame member 66. This arrangement allows the prongs 36, 38 to be moved farther apart or closer together while keeping them parallel to one another, lying in the same plane and having the ends of the prongs 36, 38 aligned so that the ends define the corners of a rectangle.

Still referring to FIG. 1, the distance between the prongs 36, 38 is determined and adjusted by a screw mechanism. A bearing housing 88 is fixed to the rear face 70 of the prong supporting and carrying frame member 66 in the middle of the length of the frame member 66. A threaded rod 90, having a smooth portion along its midpoint, is inserted into the bearing housing 88 and includes a left-hand end 92 extending outwardly to a left-hand end 94 of the frame member 66 and a right-hand end 96 extending outwardly to a right-hand end 98 of the frame member 66. From the bearing housing 88 outwardly to the left-hand end 92, the threaded rod 90 is threaded with left-handed threads and from the bearing housing 88 outwardly to the right-hand end 98 the threaded rod is threaded with right-handed threads so that when the crank handle 100 is turned clockwise from the point of view of a user standing facing it, the prongs 36, 38 are driven farther apart and when the crank handle 100 is turned counterclockwise, the prongs 36, 28 are drawn closer together (for a larger view of the threaded rod and immediately associated fitting, see FIG. 9). The left-hand portion of the threaded rod 90 is threaded into the left-side control nut 102 on the left-side prong mounting bracket 56 and a corresponding right-side control nut 104 is fixed to the right-side prong mounting bracket 76 and the right-hand portion of the threaded rod 90 is inserted into it. Both control nuts 102, 104, one having a right-handed thread and the other a left-handed thread, are jammed together tightly to form a stop for preventing said left-side prong and said right-hand prong from being placed into an unstable relationship by being adjusted too close to each other. Alternatively the control number 102, 104 can be welded together. As a practical matter, any having the prongs 36, 38 less than roughly one-third of the maximum width makes for an unstable pallet jack 10. The maximum and maximum spacings between the prongs 36, 38 depends on the overall scale of the pallet jack 10 and its intended uses. In a preferred embodiment, the full desirable spacing between the prongs 36, 38 is about 60-90 cm (24-36 inches) and the minimum allowable width, which can be user set, is about 30-340 cm (12-16 inches). The desired direction of rotation of the crank handle 100 needed to spread the prongs 36, 38 apart or draw them together can be changed by, among other methods, changing the handedness of the threading on the threaded rod 90. In this manner the distance between the left-side prong 36 and the right-side prong 38 is adjusted so that the pallet jack 10 can lift and transport pallets having different spacing between their vertical frame members.

Still referring to FIG. 1, the crank handle 100 is pivotally connected to a crank arm 106, that is connected to an axle 108 having a large drive gear 110 fixed to it. A small drive gear 112 is fixed to the threaded rod 90 adjacent to the bearing housing 88 and these two gears are connected by a continuous loop drive chain 114, which is preferably a bicycle-type chain, while an upper idler gear 116 and a lower idler gear 118 prevent the drive chain 114 from rubbing against any portion of the frame 12 and pinch the two sides of the loop formed by the drive chain 114 together keeping them close together and parallel to each other along a substantial length 120 of the drive chain 114. The drive chain 114 preferably includes a keeper link to permit easy removal and repair or replacement of the drive chain 114 without disassembling the drive mechanism.

Still referring to FIG. 1, a pair of jam nuts 122, 124 are tightly screwed together to serve as a stop that prevents the prongs 36, 28 from being moved so close together that a pallet load may cause the pallet jack 10 to tip to one side or the other, that is, a certain minimum distance between the prongs 36, 28 is required in order to provide a stable platform for moving loads on pallets. Because the prongs 36, 38 move in rigid tandem fashion, a stop only needed on one side of threaded rod 90. Other means for stopping inward movement of the prongs 36, 38 can be provided, such as stopping the threading of the threaded rod 90 at an appropriate point adjacent to the bearing housing 88, running a weld bead at the desired point, and so forth. On the outer ends of the threaded rod 90, outward movement, that is, the spreading movement, of the prongs 36, 38 is stopped by a retainer clip 126 mounted in a retainer clip channel 128, both seen in FIG. 5, or other suitable stop on each outer end of the threaded rod 90 to stop the left-side prong 36 and the right-hand prong 38 from running off of their respective ends of the threaded rod 90 at the outer spreading limit of the left-side prong 36 and the right-side prong 38.

Still referring to FIG. 1, exploded away from the pallet jack 10 to reveal the drive mechanism is a housing cover 130 having a horizontal flange portion 132 that is fastened to the frame 12 through the apertures 134. A vertical chain cover portion 136 is connected to the horizontal flange portion 132, which covers the threaded rod 90 and related hardware and which is fastened to the frame 12 using the standoffs 138. A vertically oriented chain drive housing portion 140 covers the chain drive mechanism.

Still referring to FIG. 1, the frame 12 includes a horizontally oriented base plate 142 with a left-side gusset plate 144 fixed to the base plate 142 and angled upwardly and inwardly and a right-side gusset plate 146 fixed to the base plate 142 and angled upwardly and inwardly and a rear plate 148, which is in the shape of a triangle truncated at its top and leaning toward the operator from the bottom to the top of the rear plate 148. Each of these plates is typically steel and they are typically fastened together by welding.

Figure 2:
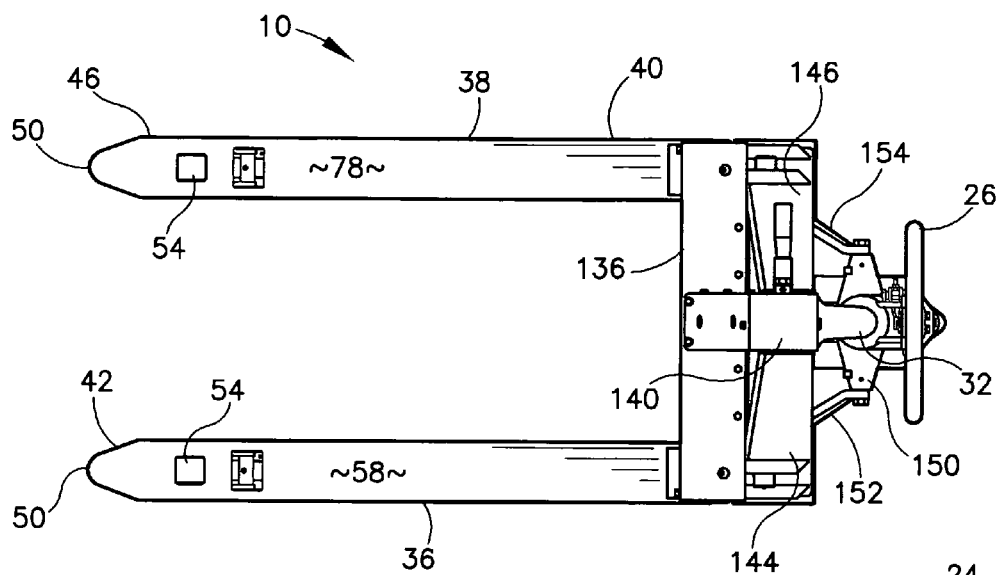
FIG. 2 is bottom view of the pallet jack having width-adjustable fork prongs of FIG. 1.

Referring to FIG. 2, a truck frame 150 includes a left-side truck arm 152 and a right-side truck arm 154 extending toward the operator forming a yoke connected to the hydraulic bottle jack frame cap 32, with the distal ends of the truck arms 152, 154 both pivotally connected to the frame 12 and their proximal ends pivotally connected to the frame cap 32.

Figure 3:
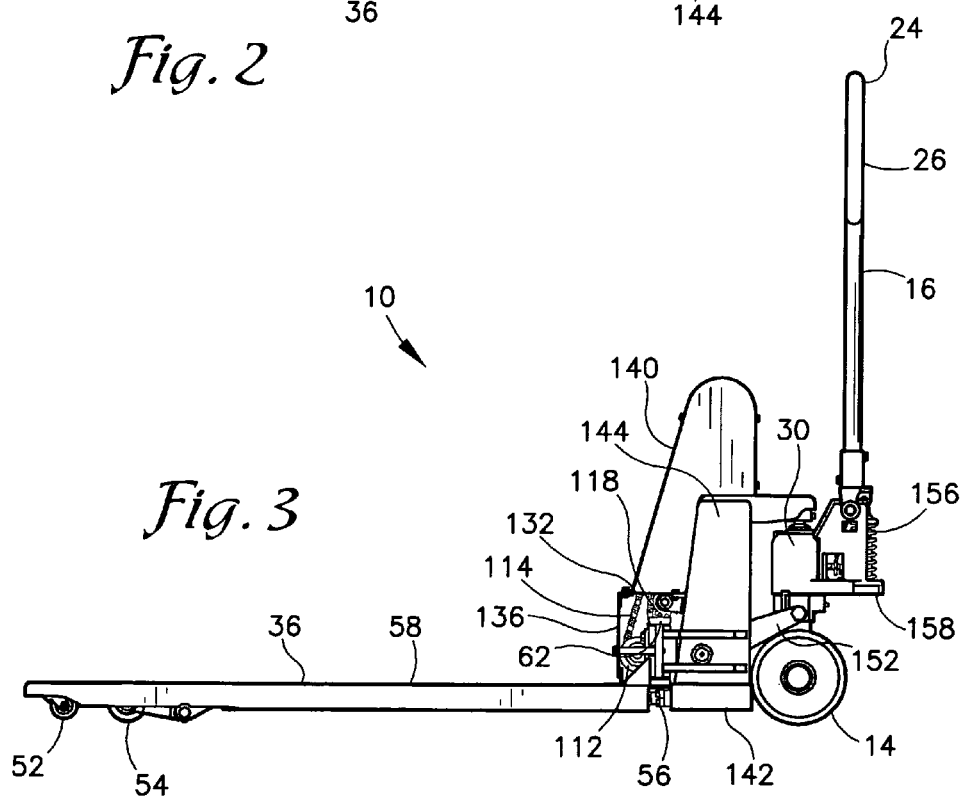
FIG. 3 is a left-hand side view of the pallet jack having width-adjustable fork prongs of FIG. 1.

Referring to FIG. 3, a compression coil spring 156 is disposed between a flange portion of a jack supporting plate 158 and the bottom end of the handle 16 to urge the handle 16 upward after it has been pulled downward by the operator to actuate the hydraulic bottle jack 30.

Referring to FIG. 4, on the top of each of the left-side prong mounting bracket 56 and the right-side prong mounting bracket 76 is a zerk grease fitting 159 for lubricating the mounting brackets 56, 76.

Referring to FIG. 5, the left-side prong mounting bracket 56 further includes an upstanding foot plate 160 that prevents the prongs 36, 38 from being pushed too far into a pallet, thereby locating the pallet on the left-side prong 36 and on the right-hand prong 36, and an upstanding left-side triangular reinforcing gusset member 162 and a spaced corresponding right-side triangular reinforcing gusset member 164. A reinforcing plate member 166 is fixed to the front face 74 of the prong supporting and carrying frame member 66. The lower idler gear 118 is fastened to an axle mounted on the bracket 168, which is fixed to the rear plate 148. The left-side prong 36 moves inwardly as shown in phantom and along the direction of the directional arrow 170, with the right-hand prong 38 moving inwardly by the same amount and then outwardly when the direction of rotation of the crank handle 100 is reversed.

Figure 6:
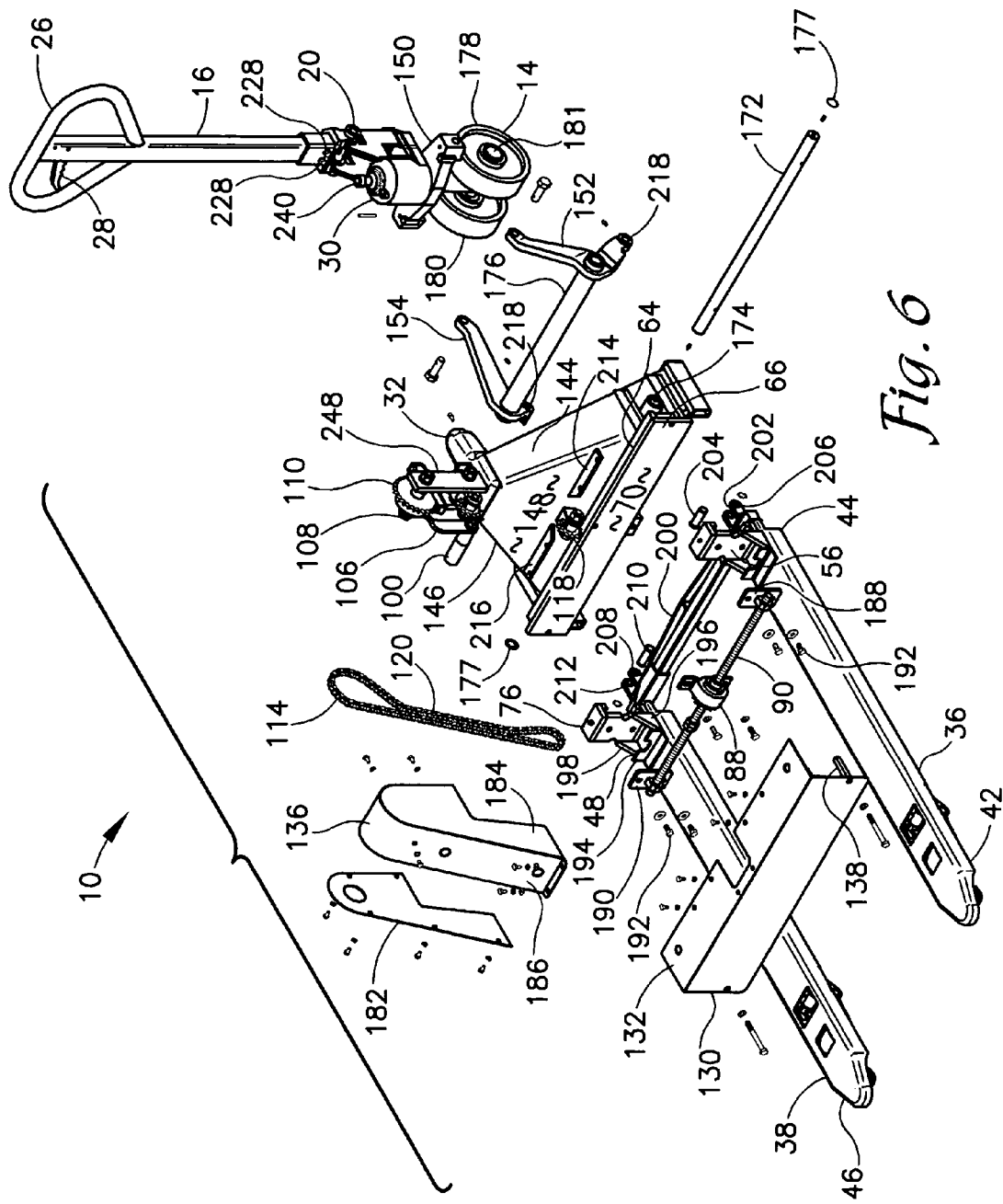
FIG. 6 is an exploded isometric view of the pallet jack having width-adjustable fork prongs of FIG. 1.

Referring to FIG. 6, a primary axle 172 is inserted through aligned axle fittings 174 in each of the right-side and left-side frame members 144, 146, respectively, and though a yoke sleeve 176 of the truck yoke and is held in place by a separate retaining clip 177 at each end. The truck 14 includes two parallel spaced wheels 178, 180, which are mounted close together on the truck axle 181 to provide a small turning radius while providing stability for the pallet jack 10. The vertical chain cover portion 140 of the drive mechanism housing cover 130 includes a right-side panel 182, a left-hand side panel 184 and a central panel 186 all fastened together to from the vertical chain cover portion 140 as shown in FIG. 1. The threaded rod 90 is connected to the left-side prong mounting bracket 56 by the flat bracket plate 188, which carries the left-side control nut 102 left-side and to the right-side prong mounting bracket 76 by the identical flat bracket plate 190, which carries the right-side control nut 104. The flat bracket plates 188, 190 are attached to the left-side and right-side prong mounting brackets 56, 76 respectively by the screws 192.

Still referring to FIG. 6, the right-side prong mounting bracket 76 further includes a right-side upstanding foot plate 194 that prevents the prongs 36, 38 from being pushed too far into a pallet, and an upstanding left-side triangular reinforcing gusset member 196 and a spaced corresponding right-side triangular reinforcing gusset member 198. This arrangement is identical to that described in connection with the left-hand prong 36 discussed above relative to FIG. 5.

Still referring to FIG. 6, a prong brace member 200 is fixed between the left-side prong 36 and the right-side prong 38 at their proximal ends and perpendicular to both prongs 36, 38 to maintain the spacing between the prongs 36, 38 and to provide the needed strength. A pair of spaced parallel left-side ears 202 are connected to the prong brace member 200 at its left end and are held into a frame member descried below by a pin 204 inserted through the aligned apertures 206 and a corresponding pair of spaced parallel right-side ears 208 are likewise fixed to the right end of the prong brace member 200 and are held into a frame member by a pin 210 inserted through the apertures 212.

Still referring to FIG. 6, to provide a means for fastening the drive mechanism housing 130, a left-side rearwardly extending flange 214 and a right-side rearwardly extending flange 216 are fixed to the face of the rear plate 148 and present a rearwardly projecting horizontal flange portion to support and to hold the horizontal flange portion 132 of the housing cover 130.

Still referring to FIG. 6, each end of the truck yoke sleeve 176 includes a depending yoke ear 218 at each end of the yoke sleeve 176 for connecting to the ears 202, 206 on the prong brace member 200.

Figure 7:
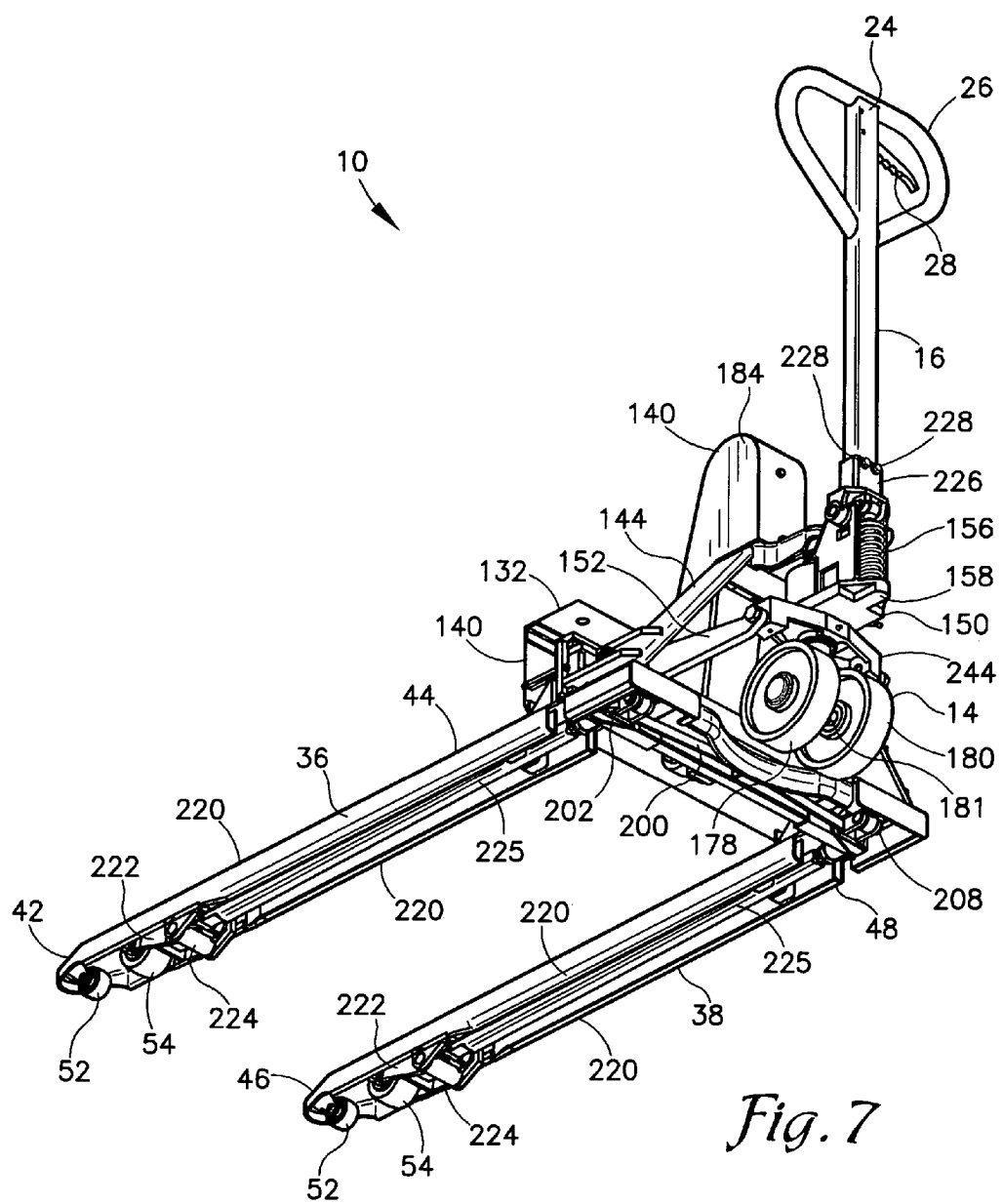
FIG. 7 is a lower isometric view of the pallet jack having width-adjustable fork prongs of FIG. 1 showing the underside of the assembled pallet jack having width-adjustable fork prongs.

Referring to FIG. 7, each of the prongs 36, 38 is formed from a channel member having a pair of depending parallel side walls 220 connected to the upper surfaces 58, 78 of the prongs 36, 38 respectively. The load rollers 54 are connected to a pivoting roller mount mechanism 222, which pivots slightly between the load rollers 54 and a secondary roller 224. A load roller actuating bar 225 is placed in the hollow portion of each of the prongs 36, 38 and is pushed toward the distal ends 42, 62 of the prongs 36, 38 to toggle the mount mechanisms 222, forcing the load rollers 54 downward to lift the prongs 36, 38 off the floor 34 enough to carry a loaded pallet. The load rollers 54 are also locked into the carrying position when the load roller actuating bars 225 are extended, which is accomplished in the conventional manner when the pallet jack 10 is readied for carrying a load.

Figure 8:
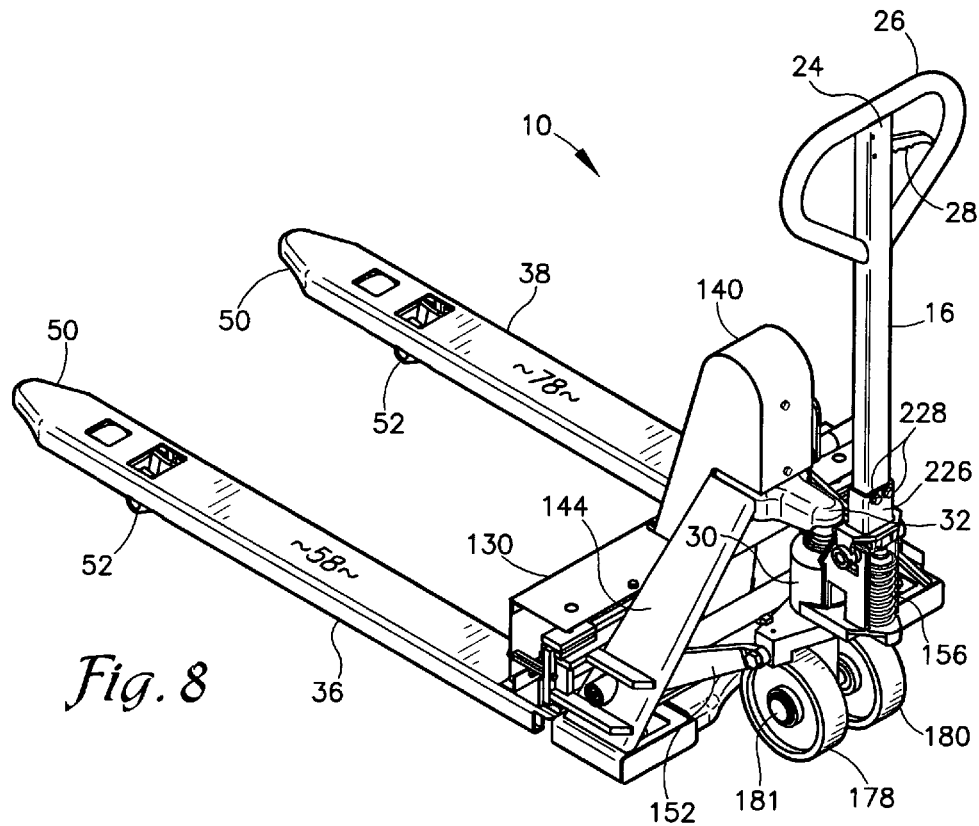
FIG. 8 is a front upper isometric view of the pallet jack having width-adjustable fork prongs of FIG. 1.

Referring to FIG. 8, the distal end of the elongated handle 16 is set into a handle socket 226 and secured by the four screws 228 (two in the front and two in the front) to facilitate shipping the pallet jack 10 in a smaller volume. Similarly, the prongs 36, 38 can be removed for shipping.

Figure 9:
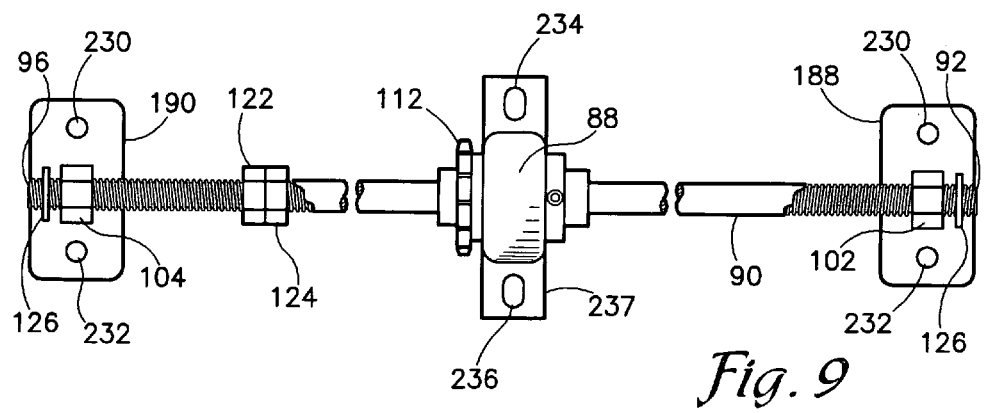
FIG. 9 is a rear view of a fork prong adjustment screw rack and gear box for use in the pallet jack having width-adjustable fork prongs of FIG. 1.

Referring to FIG. 9, these features associated with the threaded rod 90 are principally discussed above in connection with FIG. 1. Each flat bracket plate 188, 190 includes an upper aperture 230 and a lower aperture 232 for inserting screws to secure the flat bracket plates 188, 190 to the left-side prong mounting bracket 56 and the right-side prong mounting bracket 76. The left-side and right-side control nuts 102, 104, respectively, are each welded to a flat bracket plate 188 of 190. The bearing housing 88 includes a upper aperture 234 and a lower aperture 236 for fastening the bearing housing bracket 237 to the rear face 70 of the prong supporting and carrying frame member 66, as shown in, for example, FIG. 5).

Figure 10:
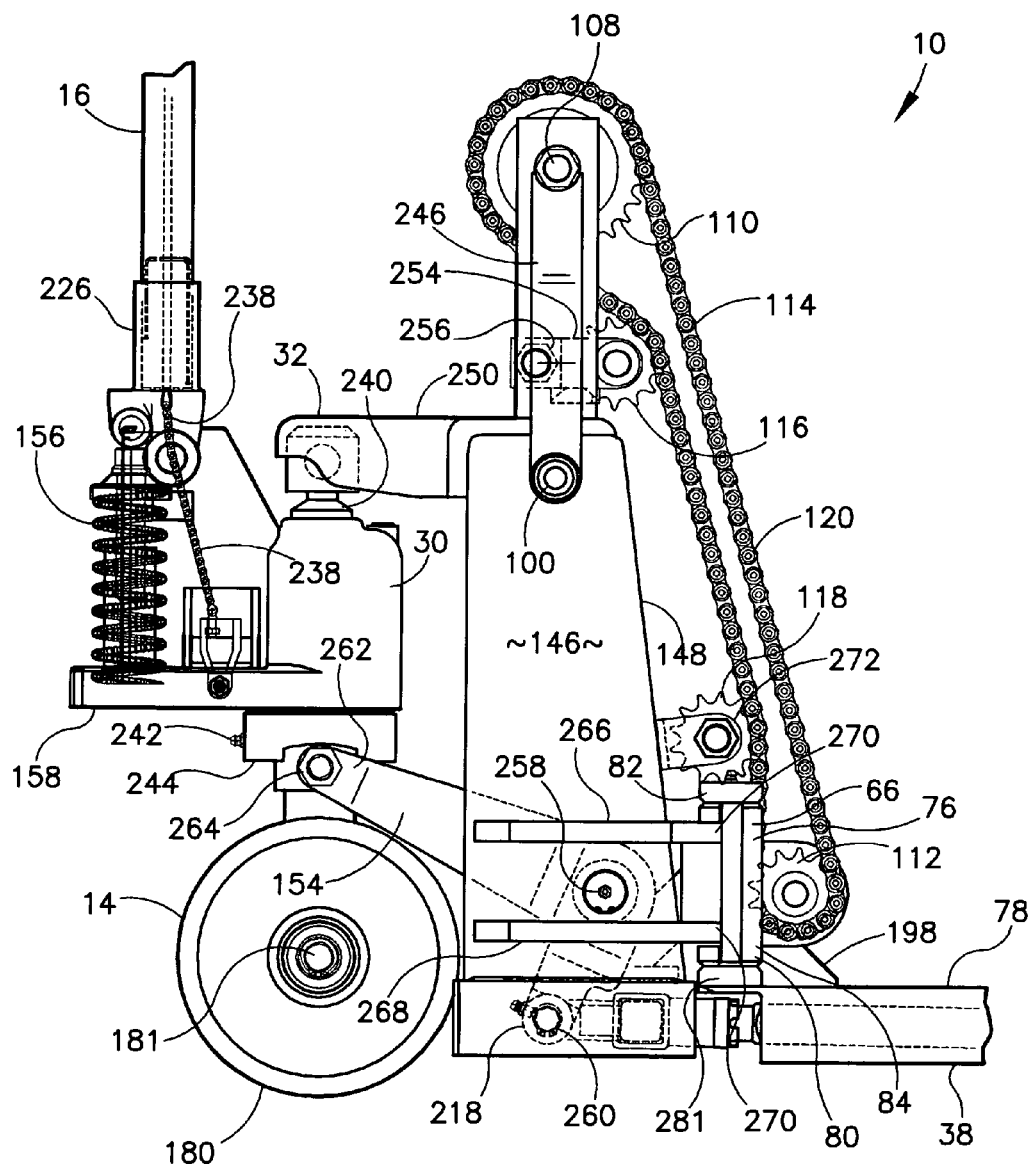
FIG. 10 is an enlarged fragmentary side view of the truck and fork width adjustment mechanism of the pallet jack having width-adjustable fork prongs of FIG. 1 shown with the housing cover removed to reveal the adjustment chain drive.

Referring to FIG. 10, the pressure release cable 238 is connected to the pressure release control valve trigger 28 (FIG. 1), such that pulling on the trigger 28 releases the pressure in the hydraulic bottle jack 30, allowing its piston 240 to descend back into the hydraulic bottle jack 30, lowering the pallet jack 10. A grease fitting 242 facilitates lubrication of the truck pivot hub 244. A crank support bracket 246 supports the large drive gear 110 and the upper idler gear 116 above the horizontal top plate 250 of the frame 12 and the crank support bracket 246 is fixed in its vertical position by welds. The upper idler gear 116 is mounted on the crank support bracket 244 by the mounting bracket 254, which carries the chain tensioning mechanism 256 that allows the user to tighten or loosen the chain 114 to achieve a desired tension. The crank, gears and drive chain serve to translate rotation of the crank, which is formed by the crank handle 100 and the crank arm 106, into rotation of the threaded rod 90.

Still referring to FIG. 10, the ear portion 218 and the attached to the right-side truck arm 154 are free to pivot about the pivot pin 258, which holds the two parts together. The lower end of the ear portion 218 includes apertures for joining spaced parallel right-side ears 208 of the right-side prong 38 in pivotal relationship at the fastening pin 260. The proximal end 262 of the right-side truck arm 154 is pivotally connected to the truck by the bolt 264. These connections together define a system for retaining a proximal end of said left-side prong and a proximal end of said right-side prong in contact with said prong supporting and carrying frame member. An upper reinforcing plate 266 and a lower reinforcing plate 268 are horizontally oriented and welded to the right side gusset plate 146 so that the rear edge 270 of each butts against the prong supporting and carrying frame member 66 to provide more strength. The left-side is identical and the parts are shown in e.g., FIGS. 2, 6, 7.

Still referring to FIG. 10, the right-side prong mounting bracket 76, which is identical to the left-side prong mounting bracket 56 is clearly seen to form the U-shaped channel bracket portion 80 having a vertical bracket portion 84 connected to a horizontal portion 82, with the lower arm of the channel 80 being the lower horizontal plate 281 connected to the bottom edge of the vertical bracket portion 84.

Figure 11:
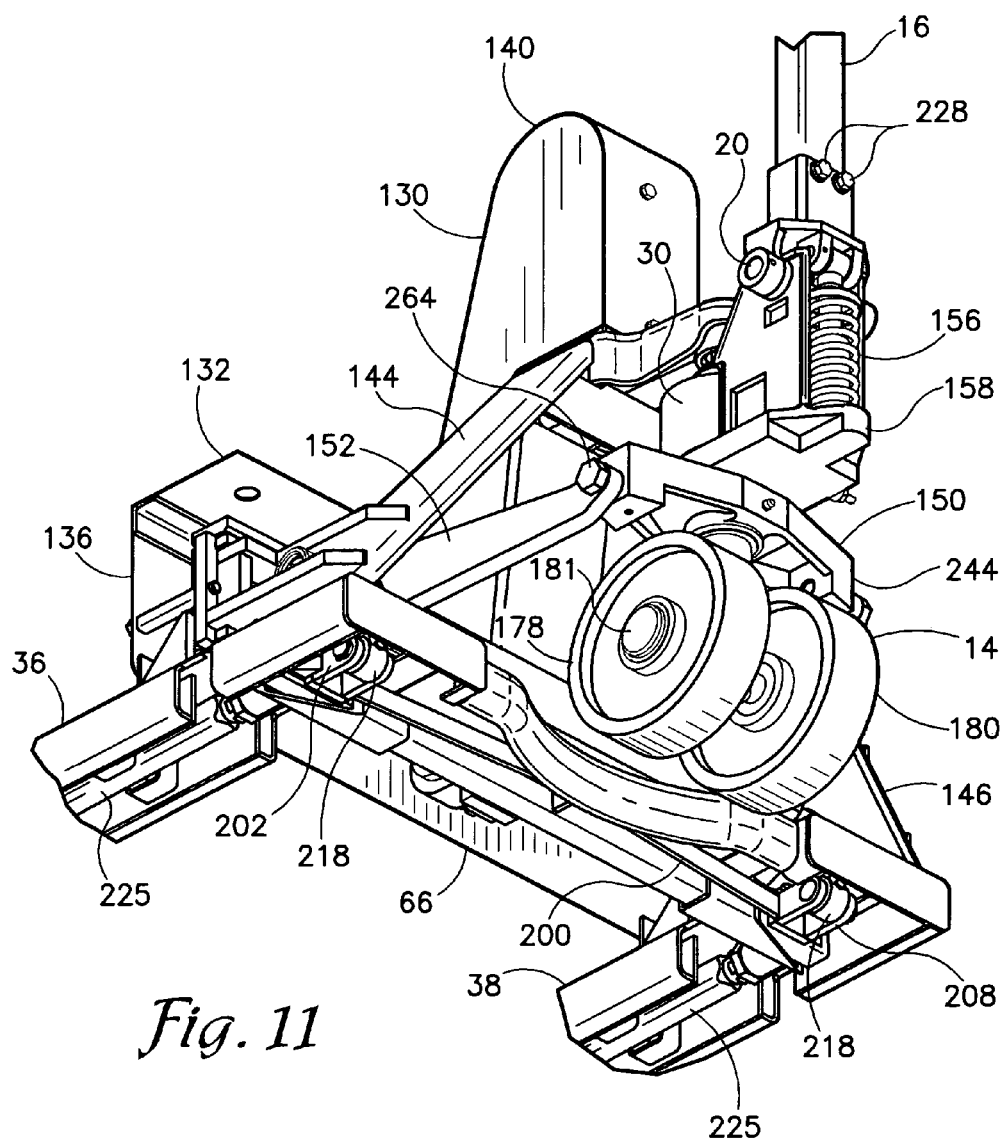
FIG. 11 is a lower fragmentary isometric view of the truck assembly of the pallet jack having width-adjustable fork prongs of FIG. 1.

FIG. 11 shows more clearly certain features of the pallet jack 10, notably the truck 14 and the fastening of the truck 14 and the prongs 36, 38 to the frame 12 that are discussed above.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

We claim:

1. A pallet jack adapted for lifting and moving a pallet comprising:
    a frame;
    a wheeled truck pivotally coupled to the frame;
    an extensible jack mounted intermediate the wheeled truck and the frame and adapted for raising and lowering the frame relative to the wheeled truck;
    a left-side prong including a proximal end and a distal end, including a load roller mounted to said prong proximate said distal end;
    a left-side prong bracket shiftably connecting said proximal end of said left-side prong for translational movement along said frame;
    a right-side prong including a proximal end and a distal end, including a load roller mounted to said prong proximate said distal end;
    a right-side prong bracket shiftably connecting said proximal end of said right-side prong for translational movement along said frame;
    said frame including a drive member operative for simultaneously shifting said left-side and right-side prongs alternately toward and away from each other in a shifting direction while maintaining said left-side prong substantially parallel to said right-side prong and both of said prongs substantially perpendicular to said shifting direction.

2. A pallet jack as set forth in claim 1, further including a yoke including a left side truck arm and a right side truck arm, each of said left side truck arm and said right side truck arm being operatively connected to respective load rollers for shifting the load rollers toward the floor during extension of said jack.

3. A pallet jack as set forth in claim 1, wherein said drive member includes an elongated threaded rod threadably connected to each of said left-side prong bracket and said right-side prong bracket.

4. A pallet jack as set forth in claim 1, including a stop for preventing shifting of said left-side prong and said right-side prong into an unstable relationship.

5. A pallet jack in accordance with claim 3, further comprising a set of right-handed threads on a left-hand side of said threaded rod and a set of left-handed threads on a right-hand side of said threaded rod.

6. A pallet jack in accordance with claim 3, further comprising a stop on a right-hand end of said threaded rod and a stop on a left-hand end of said threaded rod for stopping said right-side prong from running off said threaded rod and for stopping said left-side prong from running off said threaded rod.

7. A pallet jack in accordance with claim 3, further comprising a manually operated actuator operatively connected to a gear for turning said threaded rod.

* * * * *